United States Patent
Kim et al.

(10) Patent No.: US 12,033,413 B2
(45) Date of Patent: Jul. 9, 2024

(54) METHOD AND APPARATUS FOR DATA STRUCTURING OF TEXT

(71) Applicant: 42Maru Inc., Seoul (KR)

(72) Inventors: Dong Hwan Kim, Seoul (KR); You Kyung Kwon, Seoul (KR); So Young Ko, Seoul (KR); Sook Jin Roe, Seoul (KR); Ki Beom Kwon, Gyeonggi-do (KR); Da Hea Moon, Seoul (KR)

(73) Assignee: 42 Maru Inc., Seoul (KR)

( * ) Notice: Subject to any disclaimer, the term of this patent is extended or adjusted under 35 U.S.C. 154(b) by 271 days.

(21) Appl. No.: 17/502,017

(22) Filed: Oct. 14, 2021

(65) Prior Publication Data

US 2023/0110931 A1 Apr. 13, 2023

(30) Foreign Application Priority Data

Oct. 13, 2021 (KR) .......... 10-2021-0135569

(51) Int. Cl.
*G06K 9/00* (2022.01)
*G06F 16/953* (2019.01)
(Continued)

(52) U.S. Cl.
CPC .......... *G06V 30/413* (2022.01); *G06F 16/953* (2019.01); *G06F 40/20* (2020.01);
(Continued)

(58) Field of Classification Search
CPC .... G06V 30/10; G06V 30/414; G06V 30/416; G06V 30/40; G06V 30/412;
(Continued)

(56) References Cited

U.S. PATENT DOCUMENTS 10,957,433 B2  3/2021 Lucas et al.
2008/0152238 A1* 6/2008 Sarkar .................. G06V 30/40
382/228

(Continued)

FOREIGN PATENT DOCUMENTS

JP         2021-060876        4/2021
KR  10-2019-0123790 A    11/2019

(Continued)

OTHER PUBLICATIONS

Extended European Search Report dated Apr. 5, 2022 for EP 21202576.1, 8 pages.

(Continued)

*Primary Examiner* — Alex Kok S Liew
(74) *Attorney, Agent, or Firm* — Sughrue Mion, PLLC

(57) ABSTRACT

Provided are method and apparatus for data structuring of text. The apparatus for data structuring of text includes a data extraction unit configured to extract text and location information of the text from an image based on an optical character recognition (OCR) technique, a data processing unit configured to generate a text unit based on the text and the location information, a form classification unit configured to classify a form of the image based on the text, a labeling unit configured to label the text unit as first text, second text, and third text respectively corresponding to an item name, an item value, or others based on the classified form, a relationship identification unit configured to map and structure the second text corresponding to the first text, and a misrecognition correction unit configured to determine misrecognition of the first text and correct the first text determined to be misrecognized.

13 Claims, 4 Drawing Sheets

(51) Int. Cl.
*G06F 40/20* (2020.01)
*G06V 30/12* (2022.01)
*G06V 30/19* (2022.01)
*G06V 30/412* (2022.01)
*G06V 30/413* (2022.01)
*G06V 30/414* (2022.01)
*G06V 30/416* (2022.01)

(52) U.S. Cl.
CPC ........ *G06V 30/12* (2022.01); *G06V 30/19093* (2022.01); *G06V 30/412* (2022.01); *G06V 30/414* (2022.01); *G06V 30/416* (2022.01)

(58) Field of Classification Search
CPC ........... G06V 30/413; G06V 30/19173; G06V 30/418; G06V 30/224; G06V 30/12; G06V 30/1444; G06V 10/82; G06V 30/1448; G06V 10/10; G06V 10/96; G06V 30/262; G06V 30/268; G06V 30/18057; G06V 30/422; G06V 10/98; G06V 20/62; G06V 30/1478; G06V 30/153; G06V 30/18171; G06V 30/19107; G06V 30/2247; G06V 30/226; G06V 30/246; G06V 10/22; G06V 10/225
See application file for complete search history.

(56) References Cited

U.S. PATENT DOCUMENTS

2011/0280481 A1* 11/2011 Radakovic ........... G06V 10/987
 382/311
2020/0110930 A1 4/2020 Simantov et al.

FOREIGN PATENT DOCUMENTS

KR 10-2021-0033730 A 3/2021
KR 10-2021-0050202 A 5/2021

OTHER PUBLICATIONS

Korean Office Action dated Aug. 24, 2023 in Application No. 10-2021-0135569.

* cited by examiner

METHOD AND APPARATUS FOR DATA STRUCTURING OF TEXT

CROSS-REFERENCE TO RELATED APPLICATION

This application claims priority to and the benefit of Korean Patent Application No. 10-2021-0135569, filed on Oct. 13, 2021, the disclosure of which is incorporated herein by reference in its entirety.

BACKGROUND

1. Field of the Invention

The present invention relates to a method and apparatus for data structuring of text, and more particularly, to a method and apparatus for data structuring of text that is capable of improving the efficiency of operational management of documents by structuring text included in an unstructured image document.

2. Discussion of Related Art

In the industrial field, there has been a continuous demand for processing unstructured documents that are mutually transmitted between individuals, organizations, or different organizations so that the unstructured documents can be effectively managed and operated. However, there is a disadvantage that a large cost is required for a simple iterative input process of information due to different document formats, diversity of terms, and the like.

SUMMARY OF THE INVENTION

The present invention is directed to efficient operational management of an image document through classification of an image document, extraction of text (item name and item value) in the image document, data structuring of text, correction of misrecognition, and the like.

According to an aspect of the present invention, there is provided an apparatus for data structuring of text including a data extraction unit configured to extract text and location information of the text from an image based on an optical character recognition (OCR) technique, a data processing unit configured to generate a text unit based on the text and the location information, a form classification unit configured to classify a form of the image based on the text, a labeling unit configured to label the text unit as first text, second text, and third text respectively corresponding to an item name, an item value, or others based on the classified form, a relationship identification unit configured to map and structure the second text corresponding to the first text, and a misrecognition correction unit configured to determine misrecognition of the first text and correct the first text determined to be misrecognized.

According to an aspect of the present invention, there is provided a method of data structuring of text including extracting text and location information of the text from an image based on an OCR technique, generating a text unit based on the text and the location information, classifying a form of the image based on the text, labeling the text unit as first text, second text, and third text each corresponding to an item name, an item value, or others based on the classified form, mapping and structuring the second text corresponding to the first text, and determining misrecognition of the first text and correcting the first text when the first text is determined to be misrecognized.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 2 is a diagram illustrating an input and output of a process of extracting text from an image according to an embodiment of the present invention;

DETAILED DESCRIPTION OF EXEMPLARY EMBODIMENTS

Figure 1:
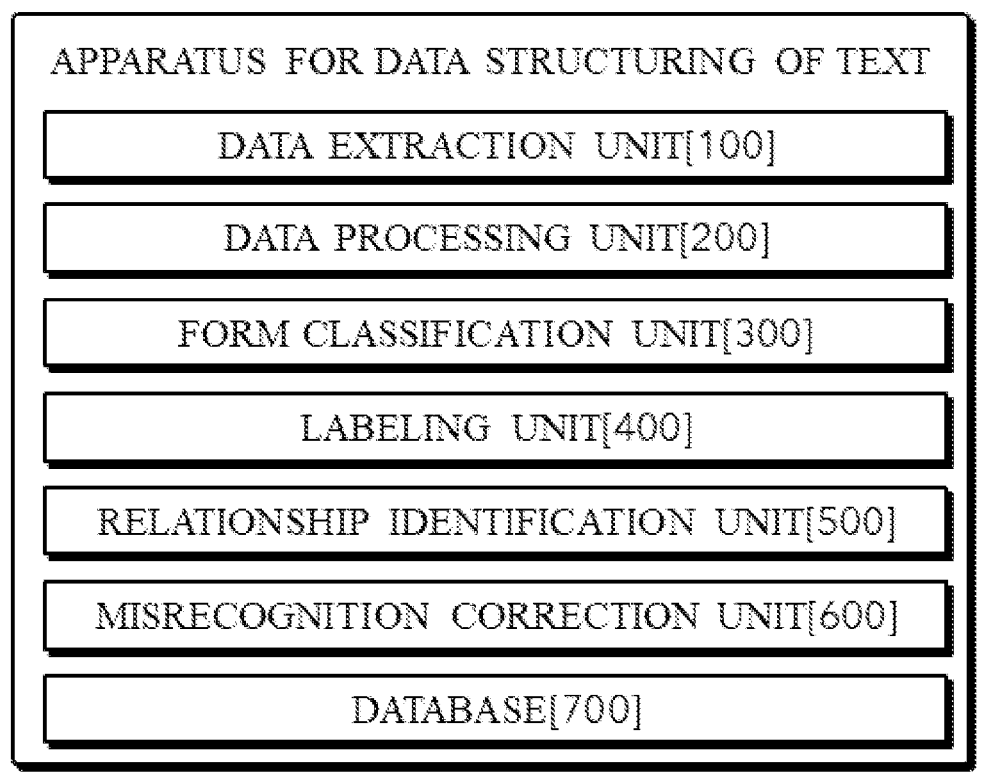
FIG. 1 is a diagram illustrating a schematic structure of an apparatus for data structuring of text according to an embodiment of the present invention.

The above-described objects, features, and advantages will be described below in detail with reference to the accompanying drawings, and accordingly, those skilled in the art to which the present invention pertains will be able to easily implement the technical idea of the present invention. When it is determined that the detailed description of the known art related to the present invention may unnecessary obscure the gist of the present invention, a detailed description thereof will be omitted.

In the drawings, the same reference numerals are used to designate the same or similar elements, and all combinations described in the specification and claims may be combined in any manner. Unless otherwise specified, it should be understood that references to the singular may include more than one, and references to the singular may also include the plural.

The terms used in this specification are for the purpose of describing specific exemplary embodiments only and are not intended to be limiting. Singular expressions as used herein may also be intended to include plural meanings unless clearly indicated otherwise in the corresponding sentence. The term "and/or" includes all combinations and any of the items listed in connection therewith. The terms "include," "including," "being included," "comprising," "have,", "having," and the like have inclusive meanings, and accordingly, these terms specify features, integers, steps, actions, elements, and/or components described herein, and do not preclude the presence or addition of one or more other features, integers, steps, actions, elements, components, and/or groups thereof. The steps, processes, and operations of the method described herein should not be construed as necessarily being performed in any specific order as discussed or exemplified unless specifically determined to be the order of performance thereof. It should also be understood that additional or alternative steps may be used.

In addition, each component may be implemented as a hardware processor, the above components may be integrated and implemented as one hardware processor, or the above components may be combined with each other and implemented as a plurality of hardware processors.

Hereinafter, exemplary embodiments of the present invention will be described in detail with reference to the accompanying drawings.

FIG. 1 is a diagram illustrating a schematic structure of an apparatus for data structuring of text according to an embodiment of the present invention.

Referring to FIG. 1, the apparatus for data structuring of text according to the embodiment of the present invention includes a data extraction unit 100, a data processing unit 200, a form classification unit 300, a labeling unit 400, a relationship identification unit 500, a misrecognition correction unit 600, and a database 700 and may extract user's desired information from a received image.

Figure 2:
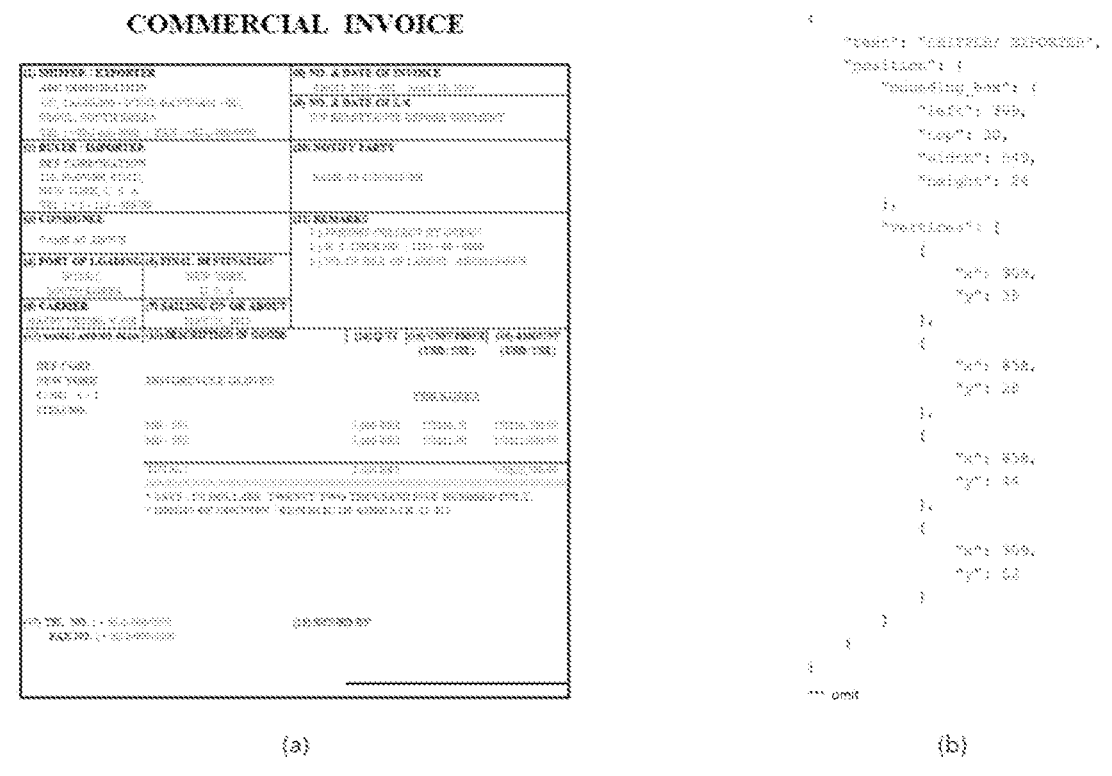

The data extraction unit 100 may extract text included in an image received by a user terminal (not illustrated) and location information of the text. The data extraction unit 100 may extract the text included in the image and the location information of the text based on an optical character recognition (OCR) technique. For example, the data extraction unit 100 may apply the OCR technique to the image as illustrated in FIG. 2A and extract an output as illustrated in FIG. 2B.

The data processing unit 200 may generate a text unit based on the text extracted from the data extraction unit 100 and the location information. The data processing unit 200 may set a text unit based on a preset length threshold value and a distance between keywords included in the text, based on the location information of the text.

The form classification unit 300 may classify the form of the received image based on the text extracted by the data extraction unit 100. The form classification unit 300 may search for the text extracted by the data extraction unit 100 in the database 700 in which a plurality of previously registered form samples are stored, identify the form most similar to the text, and classify the form of the received image.

For example, the form classification unit 300 includes a first form including text A, B, C, and D and a second form including text A, C, E, and F in the form sample, and classifies the form of the received image into the first form when the text extracted by the data extraction unit 100 includes the text A, B, and C.

The labeling unit 400 may label the text units as first text to third text based on the forms (e.g., items for each form or the like) classified by the form classification unit 300. The labeling unit 400 may label text corresponding to an item name as the first text, text corresponding to an item value as the second text, and text corresponding to others as the third text among the text units.

The labeling unit 400 may apply the text unit included in the set group to a text classification model, which is a BERT-based natural language processing model, to label the text unit with the item name, the item value, or the like.

The text classification model operates as a pre-trained model by the labeling unit 400 based on training data labeled with the item name, the item value, or others by the user to label the text unit included in a group. The text classification model may modify and train training data for characters with a high misrecognition occurrence rate, such as O-Q to prepare for a case where the text extracted by the OCR technique is misrecognized. For example, when one text includes Orange, the text classification model may further perform keyword training on the Qrange as well as the keyword training on the Orange.

The relationship identification unit 500 may structure the text by mapping the first text and the second text labeled by the labeling unit 400. The relationship identification unit 500 may map the second text corresponding to the first text, that is, the item value corresponding to the item name, to each other.

The relationship identification unit 500 may perform mapping based on the location information of the first text and the second text. The relationship identification unit 500 may identify fourth text that is the first text that falls within a preset distance threshold value with the second text.

When a plurality of fourth texts are identified, the relationship identification unit 500 may calculate the vector similarity between the second text and the fourth text through a similarity verification model and map the fourth text with the highest similarity to the second text based on the calculated vector similarity.

In this case, when identifying the fourth text, the relationship identification unit 500 processes the mapping process under the assumption that in the format of the form, the first text has a larger y value or a smaller x value in the location information than the second text.

Also, when a plurality of second texts having the same format are present in one group, the relationship identification unit 500 may map all the second texts to the first text that is mapped to the leftmost second text or the first text mapped to the uppermost second text.

The relationship identification unit 500 may set the first text and the second text mapped to the first text as a group to map texts for the item name-item value. Accordingly, one group may include a text unit for the item name and a text unit for at least one item value.

The misrecognition correction unit 600 may determine whether the first text is misrecognized and correct the first text. The misrecognition correction unit 600 may compare the first text and the representative keyword for the item name in the training data of the natural language processing model used by the labeling unit 400. Since the keyword for the item name in the training data includes all keywords that are modified to prevent the misrecognition, it is possible to determine whether or not the misrecognition occurs by comparing the first text with an unmodified representative keyword.

The misrecognition correction unit 600 may calculate the similarity between the representative keyword and the first text and may determine that, when the representative keyword and the first text are not identical to each other but the calculated similarity is greater than or equal to a preset similarity threshold, the first text is misrecognized.

The misrecognition correction unit 600 may correct the first text determined to be misrecognized as a representative keyword and provide correction details to the user terminal.

Since the item name serves as an indicator of the data written in the form, as the misrecognized item name acts as a major obstacle in the data structuring process, the misrecognition correction unit 600 corrects the first text corresponding to the item name to improve the quality of data structuring and reduce a workload in the inspection and calibration process.

The apparatus for data structuring of text according to the embodiment of the present invention is somewhat dependent on data because it is based on existing training data in the process of labeling text. To solve the above problem, an apparatus (see FIG. 3) for data structuring of text according to another embodiment of the present invention may include a data extraction unit 100, a data processing unit 210, a form classification unit 300, a labeling unit 410, a relationship identification unit 510, a misrecognition correction unit 600, and a database 700.

Figure 3:
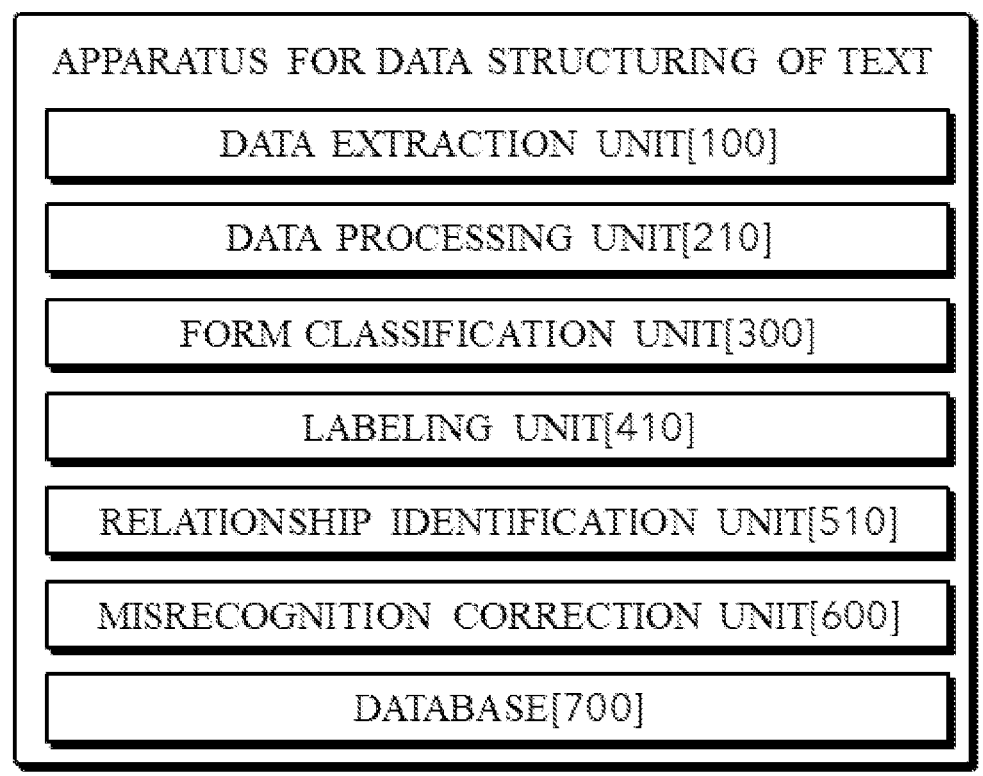
FIG. 3 is a diagram illustrating a schematic structure of an apparatus for data structuring of text according to another embodiment of the present invention.

The apparatus for data structuring of text according to another embodiment of the present invention of FIG. 3 is different from the apparatus for data structuring of text according to the embodiment of the present invention of FIG. 1 in terms of the operations of the data processing unit, the labeling unit, and the relationship identification unit. Hereinafter, the operations of the data processing unit 210, the labeling unit 410, and the relationship identification unit 510 will be described.

The data processing unit 210 may extract line information included in an image by using text extracted by the data extraction unit 100, location information of the text, and an original image file. The data processing unit 210 may generate a text unit based on the extracted line information. Also, the line information extracted at this time may be used to map text in the relationship identification unit 510.

The labeling unit 410 may classify text units present in the image into first text to third text by applying the image received from the user terminal to the deep learning model as input data.

The labeling unit 410 may add a tag to each text unit present in the image through the deep learning model. The labeling unit 410 may add tags of <KEY-B>, <KEY-I>, <VAL-B>, and <VAL-I> to each of the keywords included in the text unit through the deep learning model. KEY refers to an item name, VAL refers to an item value, B refers to start, and I refers to middle.

For example, when SHIPPER/EXPORTER and NO. & DATE INVOICE keyword are present in the text, the labeling unit 410 may add tags such as SHIPPER/EXPORTER <KEY-B>, NO. & DATE <KEY-B> INVOICE <KEY-I> through a deep learning model. This will be the basis for possibly determining that SHIPPER/EXPORTER and NO. & DATE INVOICE are item names.

The labeling unit 410 may label the text by adding a tag to each keyword as described above by applying an NER technique through the deep learning model.

The relationship identification unit 510 may structure text by mapping the first text and the second text labeled by the labeling unit 410, and may further use line information extracted from the data processing unit 210.

The relationship identification unit 510 may map the first text and the second text based on the line information. Since the line information present in the document classifies text for each item, it is possible to improve the mapping accuracy of the text by further using the line information.

The relationship identification unit 510 will map the first text and the second text based on the vector similarity of the first text and the second text through a similarity verification model like the relationship identification unit 500 when there is no line information in the image.

Figure 4:
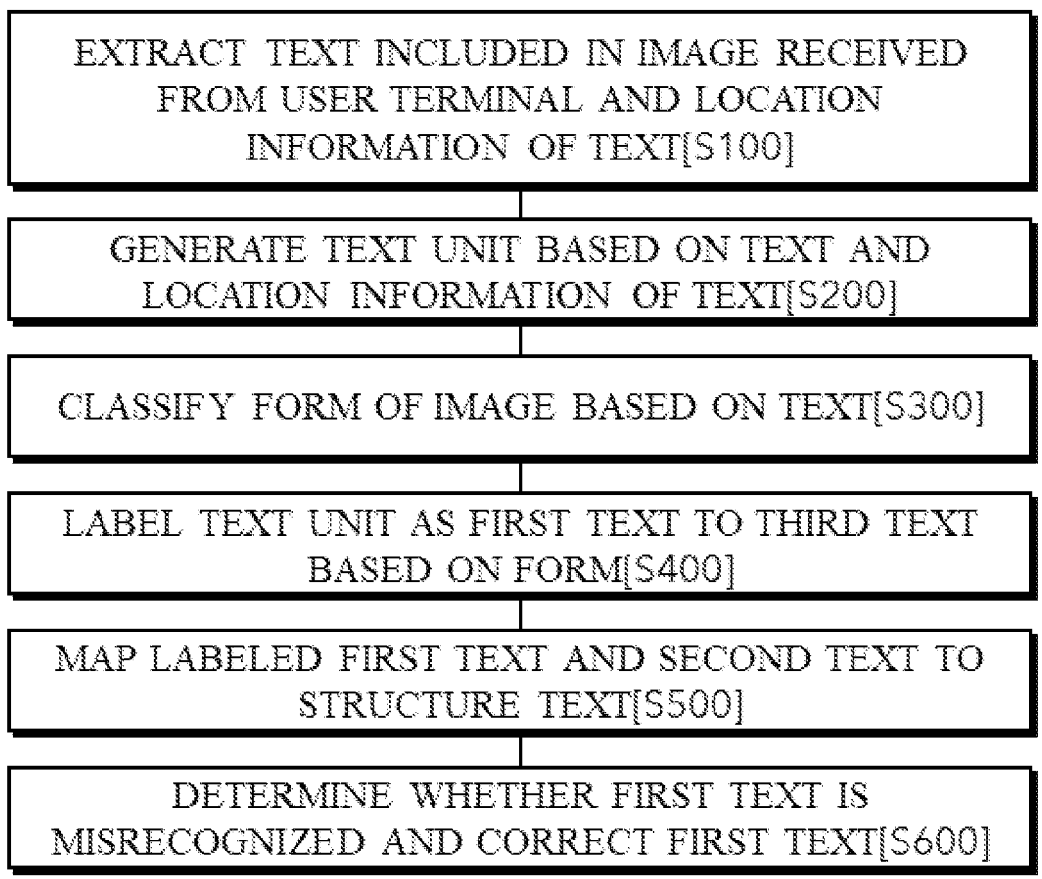
FIG. 4 is a flowchart for describing a method of data structuring of text according to an embodiment of the present invention.

FIG. 4 is a flowchart for describing a method of data structuring of text according to an embodiment of the present invention. Hereinafter, a method of data structuring of text will be described with reference to FIG. 4. In the description of the method of data structuring of text, a detailed embodiment overlapping with the apparatus for data structuring of text described above may be omitted.

In operation S100, a server may extract text included in the image received from the user terminal and location information of the text. The server may extract the text included in the image and the location information of the text based on the OCR technique.

In operation S200, the server may generate a text unit based on the extracted text and location information. In this case, the text unit may be set based on a preset length threshold value and a distance between keywords included in the text, based on the location information of the text.

In operation S300, the server may classify a form of an image based on the extracted text. The server may classify the form of the image by identifying a form most similar to the text by searching for the text extracted in the database in which a plurality of previously registered form samples are stored.

In operation S400, the server may label the text unit as the first text to third text based on the form. The server may label a text unit corresponding to an item name as the first text, a text unit corresponding to an item value as the second text, and text units corresponding to others as the third text among the text units. The server may apply the text unit included in the set group to a BERT-based natural language processing model and label the text unit as the first text to the third text corresponding to the item name, the item value, or others.

In operation S500, the server may structure the text by mapping the labeled first text and second text. The server may perform the mapping based on the location information of the first text and the second text. The server may identify fourth text which is the first text that falls within the preset distance threshold value with the second text to map the fourth text and the second text, and when there are the plurality of pieces of fourth text, the fourth text having the highest similarity may be mapped to the second text based on the vector similarity.

In operation S500, when identifying the fourth text, the server processes the mapping process under the assumption that in the format of the form, the first text has a larger y value or a smaller x value in the location information than the second text.

In operation S600, the server may determine whether the first text is misrecognized and correct the first text. The server may compare the first text and the representative keyword for the item name in the training data of the natural language processing model. Since the keyword for the item name in the training data includes all keywords that are modified to prevent the misrecognition, it is possible to determine whether or not the misrecognition occurs by comparing the first text with an unmodified representative keyword.

According to the present invention as described above, it is possible to efficiently operationally manage an image document through classification of an image document, extraction of text (item name and item value) in the image document, data structuring of text, correction of misrecognition, and the like. In addition, according to the present invention, it is possible to effectively respond to training data loading and meta-information that is differently applied according to field conditions.

Embodiments of the present invention described in the present specification and shown in the accompanying drawings are only specific examples provided in order to easily describe technical contents of the present invention and assist in the understanding of the present invention, and are not intended to limit the scope of the present invention. It is obvious to those of ordinary skill in the art to which the present invention pertains that other modifications based on the technical idea of the present invention can be implemented in addition to the embodiments disclosed herein.

What is claimed is:

1. An apparatus for data structuring of text, the apparatus comprising:
   a processor; and
   a memory storing instructions executable by the processor, wherein the processor is configured to execute the instructions to:
extract text and location information of the text from an image based on an optical character recognition (OCR) technique;
generate a text unit based on the text and the location information;
classify a form of the image based on the text;
label the text unit as first text, second text, and third text respectively corresponding to an item name, an item value, and others based on the classified form of the image;
structure the text by mapping the second text corresponding to the item value and the first text corresponding to the item name; and
determine misrecognition of the first text and correct the first text determined to be misrecognized.

2. The apparatus of claim 1, wherein the processor is configured to classify the form by searching for the text in a search engine, and
the search engine includes a plurality of form samples to label a form most similar to the text.

3. The apparatus of claim 1, wherein the processor is configured to set text whose distance between the texts is less than or equal to a preset threshold value to one text unit based on the location information of the text.

4. The apparatus of claim 3, wherein the processor is configured to use the item name corresponding to the classified form in the process of generating the text unit.

5. The apparatus of claim 4, wherein the processor is configured to apply the text unit to a natural language processing model and labels the text unit as the first text to third text.

6. The apparatus of claim 1, wherein the processor is configured to identify fourth text, which is the first text that falls within a preset distance threshold value from the second text, and maps the first text corresponding to the fourth text and the second text.

7. The apparatus of claim 6, wherein when a plurality of fourth texts are identified, the processor is configured to calculate vector similarity of the second text and each of the plurality of fourth texts through a similarity verification model, and
the first text corresponding to a fourth text having highest vector similarity among the plurality of fourth texts is mapped to the second text, and
wherein each of the plurality of fourth texts is the first text falling within the preset distance threshold value from the second text.

8. The apparatus of claim 3, wherein the processor is configured to calculate similarity of a representative keyword for the item name among training data of the natural language processing model and the first text to determine whether the first text is misrecognized.

9. A method of data structuring of text, the method comprising:
extracting text and location information of the text from an image based on an optical character recognition (OCR) technique;
generating a text unit based on the text and the location information;
classifying a form of the image based on the text;
labeling the text unit as first text, second text, and third text respectively corresponding to an item name, an item value, and others based on the classified form of the image;
structuring the text by mapping the second text corresponding to the item value and the first text corresponding to the item name; and
determining misrecognition of the first text and correcting the first text when the first text is determined to be misrecognized.

10. The method of claim 9, further comprising identifying fourth text, which is the first text that falls within a preset distance threshold value from the second text, and mapping the first text corresponding to the fourth text and the second text.

11. The method of claim 10, wherein when a plurality of fourth texts are identified, vector similarity of the second text and each of the plurality of fourth texts is calculated through a similarity verification model, and the first text corresponding to a fourth text having highest vector similarity among the plurality of fourth texts is mapped to the second text, and
wherein each of the plurality of fourth texts is the first falling within the preset distance threshold value from the second text.

12. The method of claim 9, wherein the labeling the text unit comprising:
adding one of a tag indicating the middle of the item name, a tag indicating the beginning of the item value and a tag indicating the middle of the item value to each of keywords included in the text unit through a natural language processing model;
connecting keywords with related tags; and
classifying each of the connected keywords as one of the first text corresponding to the item name, the second text corresponding to the item value, and the third text corresponding to the others.

13. The apparatus of claim 1, wherein the processor is configured to:
add one of a tag indicating the middle of the item name, a tag indicating the beginning of the item value and a tag indicating the middle of the item value to each of keywords included in the text unit through natural language processing model,
connect keywords with related tags, and
classify each of the connected keywords as one of the first text corresponding to the item name, the second text corresponding to the item value, and the third text corresponding to the others.

* * * * *